Figure 1:
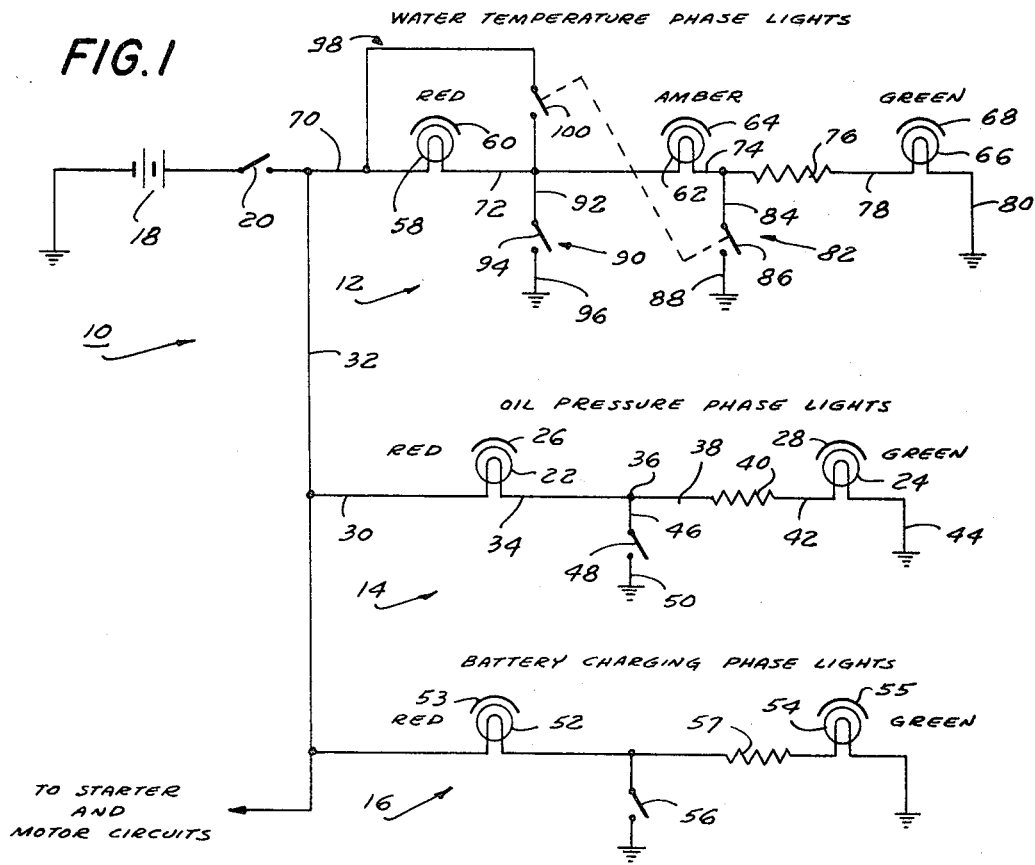

Nov. 5, 1968    J. J. DUFFY    3,409,873

SELF-MONITORING AUTOMOTIVE CONDITION-WARNING SYSTEM

Filed Dec. 16, 1965

INVENTOR.
JOHN J. DUFFY
BY
Kirschstein, Kirschstein & Ottinger
ATTORNEYS

United States Patent Office 3,409,873
Patented Nov. 5, 1968

3,409,873
SELF-MONITORING AUTOMOTIVE CONDITION-WARNING SYSTEM
John J. Duffy, 157 Mile Square Road,
Yonkers, N.Y. 10701
Filed Dec. 16, 1965, Ser. No. 514,323
10 Claims. (Cl. 340—52)

This invention relates to a self-monitoring automotive condition-warning system.

It is the primary object of my invention to provide a self-monitoring automotive condition-warning system which enables the driver of an automobile to determine whether certain conditions in his automobile such, for example, as oil pressure, battery operation and water temperature are correct for the normal operation of his automobile and whether the conditions are such as to harm the automobile engine and which system functions so that the driver may simultaneously determine if the condition-warning system is operative.

It is conventional in modern day automobiles to economize by eliminating certain analogue gauges and in lieu thereof providing signalling means commonly known as "idiot lights" which operate in response to adverse or improper automotive conditions. Thus, there may be provided a lamp that lights when the water temperature of the automobile engine is too high, another that lights when the oil pressure is too low, and still another that lights when the automobile battery is discharging. The state of other automobile conditions may also be indicated by signalling means.

The difficulty with present day systems of this type is that there is no signal which may be seen when the car is functioning in proper or normal operating condition, that is, there is no signal that indicates that the water temperature is proper (neither too high nor too low), that the oil pressure is proper (not too low), and that the battery is being charged. Thus, if the signalling means becomes inoperative due, for example, to a lamp burning out, when the adverse condition is encountered the driver will not receive any warning signal, will believe that all is well due to the lack of any warning signal, and harm may come to the automobile engine. The driver will not expect any signal because he receives no signal under normal operating conditions and will have no way of knowing that the adverse conditions has come into existence but that the signalling means is inoperative.

Accordingly, my automotive condition-warning system yields a visual signal during the three phases of automobile operation, that is during starting or initial warm-up condition, during the normal operating condition and during the existence of a hazardous or improper condition. Thus, the automobile driver will become trained to beware that he should be receiving some visual signal during all the time that his automobile is in operation.

It is another object of my invention that my condition-warning system be self-monitoring, by which I mean that not only should the system indicate by the lighting of a warning lamp when an adverse condition in the automobile exists, but the system should also indicate to the driver when one or more of the warning lamps is burned out. Thereby, the driver can never be lulled into a sense of false security by an indication (absence of a signal) that the automobile is in proper operating condition but which is really due to the inoperativeness of the signalling means. In this manner, the driver of the automobile will be taught that whenever the system is inoperative he should bring his car to a repair station where a mechanic can determine if a warning lamp merely has to be replaced or whether there is an improper functioning of an engine component.

It is another object of my invention to provide a self-monitoring automotive condition-warning system of the character described which functions to indicate to the driver of an automobile which phase of a three or more phase condition of the automobile is in existence and which is self-monitoring so as to show when the system is not in functioning order.

It is a further object of my invention to provide a self-monitoring automotive condition-warning system of the character described which is few in its number of parts and simple in construction, and which can be installed in an automobile at relatively low cost.

Other objects of my invention in part will be obvious and in part will become apparent to the reader from the following description.

My invention accordingly consists in the features of construction, combinations of elements and arrangements of parts which will be exemplified in the self-monitoring automotive condition-warning systems hereinafter described and of which the scope of application will be indicated in the appended claims.

Figure 2:
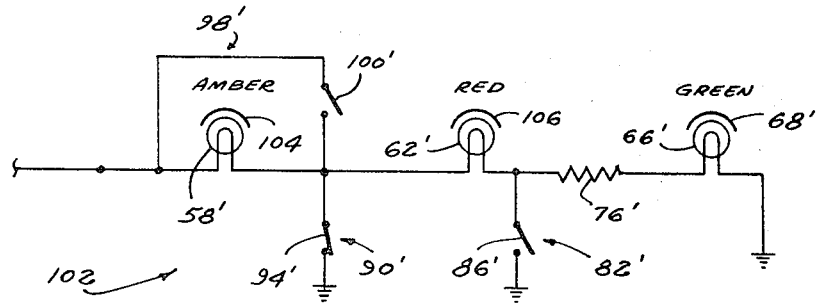

In the drawings,

FIG. 1 is a schematic diagram of the circuitry for one embodiment of my self-monitoring automotive condition-warning light system with parallel circuit branches for water temperature phase lights, oil pressure phase lights and battery charging phase lights; and FIG. 2 is a schematic diagram of a second embodiment of the branch for the water temperature phase lights.

In general, and in accordance with the teaching of my invention, I provide a self-monitoring automotive condition-warning system including a source of electrical energy, to wit, the conventional 6-volt or 12-volt battery used in an automobile. The system also includes a circuit of which the battery is a part and which is closed by the ignition switch conventionally found in the automobile.

I further provide a number of circuit branches each including a set (string) of incandescent phase lamps. Each branch is utilized in connection with a single condition of the automobile and each phase lamp of each set both yields a different color light when operationally energized and is responsive to a different phase of the condition to be governed, at least one of the phases being potentially harmful to automobile operation. As has been mentioned earlier, these conditions may include the water temperature, the oil pressure or the charging and discharging of the battery of the automobile. It is, of course, within the scope of my invention to utilize my system to indicate other conditions in the automobile as, for example, whether the headlights of the automobile are on high beam or on low beam or whether the front and rear flashing signal lamps of the automobile are energized. The number of phase lamps used for indicating any one condition depends on the number of phases into which it is desired to segregate any condition. For example, to indicate the condition of the battery, only two lamps are necessary, one to indicate a charging state of the battery and the other to indicate a discharging state of the battery. There are three phase lamps provided to indicate the condition of the temperature of the water cooling the engine, one lamp being used to indicate a "cold" temperature, a second lamp being used to indicate "normal operating" temperature and a third lamp being used to indicate a "hot" or dangerous temperature. If desired, another phase may be interposed between the "normal" and "hot" phases, which may be called an "impending danger" phase.

The battery, the ignition switch and the phase lamps, at least two and usually two or three in number, of each branch are in series connection. The endmost lamp in the series (most remote from the battery) is permanently grounded as is the battery, these grounds constituting a return line from the endmost lamp of the series circuit to the battery. In a two-lamp branch embodiment, grounding circuit means including a phase responsive switch is tapped from between the lamps and runs to ground or, in other words, runs to the return line between the endmost lamp and the battery. The phase responsive switch is movable between an open and closed position in accordance with the different phases of the condition which is being governed. Thus, if battery charging and discharging is being indicated by a branch, the grounding circuit means switch of said branch is closed when the battery is discharging and open when the battery is being charged. When the switch is open, the grounding circuit means is open and the lamps are in series across the battery; accordingly, their respective effective resistances are cumulative. The endmost (second) phase lamp lights at a substantially lower voltage, and usually a substantially lower amperage, than the other lamp, i.e., the first lamp. Thereby, when the grounding circuit means is open, the battery voltage is applied in series across both lamps but only the second lamp will light, the voltage across the first lamp being insufficient to operationally energize the same. When the grounding circuit means is closed, due to the operation of the phase responsive switch (battery discharging), the second lamp is shunted so that the battery voltage is applied only to the first lamp which thereupon solely will light. Should either of these lamps burn out during any phase of the condition of the automobile, neither lamp will light and the driver will see an abnormal condition and immediately be aware that his system should be checked.

Referring now in detail to the drawings, and particularly to FIG. 1, the reference numeral 10 denotes a three-branch self-monitoring automotive condition-warning system in accordance with my invention. The system 10 includes a branch 12 indicating the condition of the water temperature of the engine, a branch 14 indicating the condition of the oil pressure of the engine and a branch 16 indicating the condition of the charging or discharging of the battery of the automobile.

Any number of branches, similarly constructed, may be added in parallel to the system to govern various other automotive conditions which it may be desirable for the driver to watch.

The system includes a source of electrical energy 18, e.g., a 12-volt battery of the wet cell type conventionally carried by modern automobiles. One terminal of the battery is grounded to the chassis and the other terminal leads to an ignition switch 20, also conventional in automobile circuits. The ignition switch is key operated and when it is desired to drive the car it is brought from an open position to a closed position by the driver to supply current to the starter and motor circuits (not shown). The branches 12, 14 and 16 are mutually in parallel and each is individually in series with the ignition switch 20 and the battery 18.

The branch 14, as has been said, indicates the condition of the oil pressure in the automobile and signals to the driver each critical phase of the condition that the oil pressure is experiencing. The oil pressure may be in an adverse or hazardous phase which, typically, is a pressure of less than 3 p.s.i., and in such phase the driver must be warned that his automobile should be immediately brought to a repair station. The other phase may be termed a "normal operating" phase wherein the oil pressure of the automobile is above 3 p.s.i. To indicate the existence of these phases, the branch 14 includes a set, i.e. string, of incandescent phase lamps, to wit, a first phase lamp 22 and a second phase lamp 24. As will be shortly seen, one or the other of the lamps 22, 24 selectively lights in response to the presence of a different one of the two phases of the oil pressure condition, the lamp 22 lighting in response to the existence of the hazardous phase and the lamp 24 lighting in response to the existence of the normal operating phase. To make clear to the driver at a glance which of these two lamps is lit, optical coloring means is applied to each of the lamps so that each, when lit, gives off a differently colored light. For example, the lamp 22 may be capped by a red jewel 26 and the lamp 24 may be capped by a green jewel 28, the colors red and green being appropriate for the phases which the respective lamps indicate.

Branch circuit means connects the lamps 22, 24 in series with one another and with the ignition switch 20 and the battery 18. Said circuit means includes a lead 30 which runs from a trunk 32 connected to the ignition switch 20. The lead 30 runs to one terminal of the first phase lamp 22, the other terminal of which is connected by a lead 34 to a juncture 36. From the juncture 36 a lead 38 runs to a resistor 40 which is connected by a lead 42 to one terminal of the second phase lamp 24. The other terminal of the second phase lamp 24 is connected to ground by a lead 44. The connection of the lead 44 to ground and the grounding of one terminal of the battery 18 constitutes a return line between the endmost (second) lamp of the branch 14 and the battery.

Grounding circuit means is provided that includes a lead 46 which runs from the juncture 36 between the phase lamps 22, 24 to one terminal of a switch 48, the other terminal of which is connected by a lead line 50 to ground. The connection of the switch 48 to ground is, in effect, a connection to the return line between the branch circuit means and the battery 18. It will be appreciated that the grounding circuit means, when closed, shunts out the second lamp 24.

The switch 48 of the grounding circuit means is movable between an open and a closed position in response to a transducer that is sensitive to engine oil pressure so that said switch is responsive to a change in the phases of the oil pressure condition. The switch 48 is closed when the automobile engine oil pressure is below 3 p.s.i. and is open when the oil pressure is greater than 3 p.s.i. Of course, the switch 48 can be constructed to respond to different oil pressures. Switches and transducers of this type are conventional, are sold on the open market and therefore need not be further described.

The second lamp 24 becomes operational, that is lights, at a voltage substantialy lower than the voltage at which the first lamp 22 lights. The lamp 22 is designed to become operational at the full voltage supplied by the battery 18. In other words, the lamp 22 has characteristics which, when combined with other resistance between it and the battery (here only the negligible resistances of the leads and ignition switch) enable the lamp to light when the battery voltage is applied to it; the lamp 24 has characteristics which, when combined with other resistance between it and the battery (here the resistances of the resistor 40, the lamp 22 and other minor resistances in the line) enable the lamp 24 but not the lamp 22 to light when battery voltage is applied across the branch circuit means. The voltages at which the various phase lamps become operational are primarily a function of the resistance and design of their respective filaments. The lamp 24 lights at a substantially lower voltage than does the lamp 22; preferably, the lamp 22 lights at only the full battery voltage or an appreciable fraction thereof.

With the ignition switch 20 turned on (closed) and with the car operating for some time so that the oil pressure is in its normal operating range and the switch 48 is consequently open, the full voltage of the battery 18 is applied across the branch 14. Because of the voltage drop across the lamp 22, the resistor 40 and the lamp 24, the voltage applied to the lamp 24 is sufficient and proper to light this lamp. Because of the current-limiting voltage-dropping resistor 40 and the resistance of the second lamp 24, there is insufficient voltage applied to the lamp 22 to light the same so this lamp is unlit. The lamp 24 and its associated jewel cast a green light so that when the switch 48 is open due to the existence of oil pressure within the normal operating range (3 p.s.i. and higher), the driver sees the green light at a glance and thus knows that his oil pressure is proper.

If the oil pressure drops to a pressure below 8 p.s.i. the switch 48 will close, closing the grounding circuit means and thereby shunting the resistor 40 and the lamp 24. This permits the full battery voltage to be applied across the lamp 22, this being sufficient to light the same, so that the driver sees a red light which will indicate to him that his oil pressure is dangerously low.

The driver will become aware that one lamp of the set of lamps indicating the existence of a phase of the oil pressure condition should be lit at all times that the ignition switch is closed. If, during normal operation of the automobile with the switch 48 open, either the first phase lamp or the second phase lamp should burn out, the lamp 24 will be extinguished resulting in a "no lights" state so that the driver knows he should bring his automobile in for checking of the system and/or for replacement of the burned out lamp. If the oil pressure is low so that the switch 48 is closed, and if the red lamp now burns out, again the driver will see a "no lights" state and will know that he should bring his automobile in for repair. If with the switch 48 closed, the green lamp 24 burns out, the red lamp 22 will still light and the driver will bring his automobile in for repair of the oil system. When the same is repaired and it is known that the green lamp 24 should go on but does not, the driver will again be aware that the system must be fixed. Thus, the driver by observation of the lamps 22, 24 can tell the existing phase of the oil pressure condition and the system monitors itself to indicate when the system is in disrepair. The resistor 40 is current-limiting and voltage-dropping and is inserted into the branch circuit means to obtain a voltage drop along said circuit means proper for the lighting of the lamp 24, without burning out the same, and for non-lighting of the lamp 22 when the switch 48 is open.

The branch 16 is provided to indicate the charge-discharge phases of the battery of the automobile and includes two lamps, a first phase lamp 52 to indicate that the battery is discharging and a second phase lamp 54 to indicate that the battery is being charged. The lamp 52 is capped by a red jewel 53 and the lamp 54 is capped by a green jewel 55. Branch circuit means of the branch 16 connects the lamps 52, 54 and a current-limiting voltage-dropping resistor 57 in series with one another and with the ignition switch 20 and the battery 18. Grounding circuit means includes a switch 56 that runs from between the lamps to ground. The switch 56 is movable between an open and a closed position in response to, respectively, a battery charging or battery discharging condition. The branch 16 is constructed similarly to and operates in the same manner as the branch 14 except, of course, that it indicates the two phases of a different condition of the automobile.

The branch 12 indicates the temperature of the water which cools the engine, that is, indicates whether the water temperature condition is in a cold phase, a warm (normal operating) phase or a hazardous (overheated) phase. Accordingly, there are provided three phase lamps, a first phase lamp 58 capped by a red jewel 60, a second phase lamp 62 capped by an amber jewel 64 and a third phase lamp 66 capped by a green jewel 68. Branch circuit means of the branch 12 connects the lamps in series with one another and with the ignition switch 20 and the battery 18. Said circuit means includes a lead 70 which runs from the trunk 32 to one terminal of the lamp 58, the other terminal of which is connected by a lead 72 to one terminal of the lamp 62, the other terminal of the latter being connected by a lead 74 to a current-limiting voltage-dropping resistor 76. A lead 78 connects the resistor to one terminal of the lamp 66, the other terminal of which is connected by a lead 80 to ground. The connection of the branch circuit means to ground constitutes a return line between the endmost (third) lamp of said circuit means and the battery 18. The lamp 66 lights at a substantially lower voltage than do the lamps 58, 62. Preferably, the lamps 58, 62 light only at the full voltage of the battery 18 or an appreciable fraction thereof. By a substantially lower voltage is meant that the characteristics of the lamp 66 are such that when it is combined with the resistances of the other components between it and the battery (the resistor 76, the lamp 62 and the lamp 58) and the battery voltage is applied across the said circuit means, only the lamp 66 lights.

The branch 12 further includes two grounding circuit means each connected between a different pair of lamps and ground. More specifically, grounding circuit means 82 includes a lead 84 which runs from the lead 74 between the resistor 76 and the lamp 62 to one terminal of a temperature responsive switch 86, the other terminal of which is connected by a lead line 88 to ground. The switch 86 is moved by a conventional transducer sensitive to engine water temperature between an open and a closed position and moves from a closed to an open position as the water temperature increases to over approximately 113° F. It will be appreciated that the grounding circuit means 82, when the switch 86 is closed, shunts the resistor 76 and the phase lamp 66.

Another grounding circuit means 90 includes a lead 92 which runs from the lead 72 to one terminal of another temperature responsive switch 94, the other terminal of which is connected by a lead 96 to ground. The switch 94 is movable between an open and a closed position and is moved by a conventional transducer sensitive to engine water temperature from an open to a closed position as the water temperature increases to above approximately 242° F. It will be appreciated that when the grounding circuit means 90 is closed, the lamp 62, the resistor 76 and the lamp 66 are shunted so that at such time the lamps 62, 66 are deenergized.

Shunting circuit means 98 bridges the lamp 58 and includes a switch 100, the switch 100 being ganged with the switch 86 for operation in the same sense and at the same temperatures. It will be seen that when the switch 100 is closed, the lamp 58 is shunted and thereby deenergized.

Turning then to the operation of the branch 12, when the engine is cold, the switch 94 is open and the switches 86, 100 are closed because the water temperature is below 113° F. If the ignition switch 20 is now closed, the full voltage of the battery is applied across the lamp 62, the lamp 58 being shunted by the circuit means 98 and the lamp 66 and the resistor 76 being shunted by the grounding circuit means 82 so that the lamp 62 casts an amber light indicating to the driver that the water temperature is relatively cold. No other lamp is lit.

When the car has been operating for some period of time and the water temperature rises above 113° F. to normal, but, is below 242° F., the switch 94 remains open and the switches 86, 100 open so that the lamp 58, the lamp 62, the resistor 76 and the lamp 66 are in series across the battery. Due to the distribution resistance of this series connection, sufficient voltage for energization is applied only across the lamp 66 which thereupon lights and casts a green light that indicates to the driver that the water temperature condition is in its normal operating phase.

If the water temperature rises above 242° F., the switch 94 will close while the switch 100 remains open, so that the full voltage of the battery is applied across the lamp 58 which in turn will light and show a red signal indicating to the driver that the cooling system of his car should be checked.

If any of the lamps 58, 62 or 66 burns out when the temperature is normal, the green lamp 66 will go out and no lights will be seen by the driver. This will indicate to him that he should drive into a repair station to have his water temperature phase lights checked. If the amber lamp 62 burns out, no light will be seen when the water temperature is cool and when the water temperature is normal. If the red lamp 58 burns out, no light will be seen during the normal and hot phases of the water temperature condition. Thus, it will be immediately apparent to the driver through the self-monitoring feature of my invention that his condition-warning system and/or the automotive cooling system is not in proper order and should be checked.

To prevent an accidental surge of high current through the lamp 66, the switch 86 is arranged to open slightly after the switch 100 opens. Optionally, the switches 86, 100 are snap operated and thus move between their positions essentially instantaneously.

For the purpose of illustrating a working embodiment of my invention, I provide the following table which gives the rated values for each of the components of the branches 12, 14 and 16:

Battery (18) 12 V.

Water Temperature Branch (12):
 lamp (58) GE 1891, 12 v., 0.24 amp.;
 lamp (62) GE 1891, 12 v., 0.24 amp;
 lamp (66) GE 49, 2, v., 0.06 amp.;
 resistor (76) 0.5 w., 140 ohms.
Oil Pressure Warning Branch (14):
 lamp (22) GE 1891, 12 v., 0.24 amp.;
 lamp (24) GE 49, 2 v., 0.06 amp.;
 resistor (40) 0.5 w., 155 ohms.
Battery Charging/Discharging Branch (16):
 lamp (52) GE 1891, 12 v., 0.24 amp.;
 lamp (54) GE 49, 2 v., 0.06 amp.;
 resistor (57) 0.5 w., 155 ohms.

As has been mentioned earlier, the usual condition-warning system found in today's automobile comprises only a single warning light, this light being off during normal operation and being lit only when the condition is in its hazardous phase. It is interesting to explore the various situations which may occur in an automobile and to compare the conventional one-light system with the advantages of my self-monitoring system. The comparison may first be with a one-light system and my self-monitoring system, as they both would apply to indicating the oil pressure of an automobile. Branch 14, of FIG. 1 of the drawings, will be referred to.

With the situation being that the engine is running, the oil pressure is normal and then the filament of the low pressure (red) warning light breaks, with a one-light system there would be no warning at all if the oil pressure were then to drop. Obviously, serious damage could be done to the automobile engine. With my self-monitoring system in this situation, the green light 24 would go out, the "no lights" state indicating to the driver that he should bring his automobile into a repair station for replacement of a bulb.

With the situation being that the engine is running, the oil pressure is low and then the filament of the red warning light breaks, with the one-light system the red light will go out and the driver may falsely assume that his oil pressure has returned to normal; he will continue to drive and will probably damage his engine. With my self-monitoring system, the red light 22 will go out but the green light 24 will not go on. The driver will then observe a "no lights" state and will know that he must bring his automobile in for either replacement of a bulb or for repair of his oil pressure system.

With the situation being that the engine is running, the oil pressure is low and then the oil pressure returns to normal, with the one-light system the driver has no way of knowing if his pressure has returned to normal or whether the filament of the red light has burned out. With my self-monitoring system, the driver will see the red light 22 go off and the green light 24 go on, indicating that both the oil pressure and the self-monitoring system is functioning properly.

With the situation being that the ignition switch of the automobile has just been turned on but the engine has not been started, both systems will show only a red light. When the engine is first started, with the one-light system the red light will go off but the driver does not know whether this is due to the red light burning out and he will not be sure that the red light is available in the future for warning him of a low pressure situation. With my self-monitoring system, the red light 22 goes off and the green light 24 goes on indicating that the oil pressure is normal and that the system is ready to indicate the next time that the oil pressure drops.

The advantages of my self-monitoring system also are apparent when the battery charging/discharging warning branch 16 is compared with a conventional one-light system in which a red light goes on only if the battery is discharging.

With the situation being that the engine is running, the battery is charging and then the filament of the red light breaks, with the one-light system there is no warning if the battery starts to discharge. With my self-monitoring system, the green light 54 goes out and a "no lights" state indicates to the driver that his warning light system should be repaired.

With the situation being that the engine is running, the battery is discharging and the filament of the red light breaks, in the one-light system the red light goes out so that the driver in all probability will assume that his battery is now charging and will continue to drive until the battery is dead. With my self-monitoring system, if the red light 52 goes off and the green light 54 does not go on, the driver knows that either one of the lights is burned out or that his battery is not functioning properly and will bring his car in for repair.

With the situation being that the engine is running, the battery is discharging and then begins to charge, in the one-light system the red light will go out and the driver has no way of knowing whether the filament of the red light is burned out or whether the battery is in fact charging. In my self-monitoring system, the green light will now go on indicating that the battery is now charging and that the lights are properly functioning.

With the situation being that the ignition is on, before the engine is started the red lights in both the one-light and in my self-monitoring system will go on. When the engine is first started, in the one-light system the red light will go out but the driver will have no way of knowing whether or not the red light has burned out and cannot be sure that the red light is available for future warning when the battery discharges. With my self-monitoring system, when the red light goes out and the green light goes on, this indicates that the battery is charging and that the self-monitoring system is properly functioning.

A comparison of the branch 12 of my invention for indicating water temperature, this being a three-lamp embodiment, with the conventional two-light system wherein a warning is given if the water temperature is too cold or too hot, but none is given if the temperature is normal, also shows the advantages of my system.

With the situation being that the engine is running, the water temperature is normal and either the "cold" or "hot" light burns out, in the two-light system the driver will not be warned when one of the two non-normal phases exists. With my self-monitoring system, the green light 66 will go out and the driver will know that he should have his warning lights checked.

With the situation being that the engine is running, the water temperature is either low or normal and the "hot" warning light breaks, in the two-light system the "hot" light will not go on if the water temperature rises to a hazardous degree and the driver will not be warned. In my self-monitoring system, if the water temperature is low there will be no indication that the red (hot) light 58 is broken but when the temperature reaches normal and the green light 66 does not go, the driver is alerted to repair his warning lamps.

With the situation being that the engine is running, the water temperature is high and the "hot" light filament breaks, with the two-light system the "hot" light will go out and the driver will probably make the false assumption that the temperature of the water has returned to normal and will continue to drive and may damage his engine. In my self-monitoring system, when the red light 58 goes out and the green light 66 does not go on, there will exist a "no lights" state and the driver is alerted that either his monitoring system is in need of repair or that his water temperature system is in need of repair.

With the situation being that the engine is running, the water temperature is high and then returns to normal, with the two-light system the driver does not know whether the temperature in fact has returned to normal or whether the filament of the "hot" light has burned out. With my self-monitoring system, the green light 66 goes on which indicates that the self-monitoring system is fully operational and that the water temperature is proper.

FIG. 2 illustrates another embodiment 102 of a three-lamp water temperature warning branch which may be used in place of the branch 12.

The branch 102 is constructed similarly to the branch 12, and like components are referred to by the same reference numerals primed, except that an amber jewel 104 caps the phase lamp 58' and a red jewel 106 caps the phase lamp 62'. A green jewel 68' caps the lamp 66'. The difference between the branch 102 and the branch 12 is that in the branch 102, a fourth phase is interposed between the "normal" and "hot" phase, this fourth phase signalling that a dangerously hot phase of the water temperature is about to ensue. The driver is thereby warned to take immediate corrective action.

At a "cold" water temperature, that is a temperature below about 113° F., the switch 94' is closed, and the switches 86', 100' are open. Accordingly, when the water temperature is low, the grounding circuit means 90' shunts out the lamps 62', 66' and the resistor 76' so that only the amber lamp 58' lights, the lamps 62', 66' being deenergized.

When the temperature is in the range of between about 113° F. and 220° F., the switch 94' opens and the switches 86', 100' remain open. The voltage drops across the various lamps and the resistor 76' in the series circuit are such that only the lamp 66' lights and casts a green light indicating that the water temperature is normal.

When the water temperature reaches 220° F., the switch 86' closes while the switch 100' remains open. This provides a new warning signal that indicates the water temperature is, as has been mentioned, in an "imminent danger" phase, which is a prelude to overheating. It will be appreciated that such an intermediate warning signal will enable a driver to at least stop his automobile before overheating.

The new warning signal constitutes lighting of both the phase lamps 58' and 62' simultaneously so that the driver sees a red and an amber light at the same time. Full battery voltage is applied across these lamps in series when the switch 100' is open and the switch 86' is closed, the switch 94' also being open. The lamps 58', 62' have characteristics such that each of these lamps lights when full battery voltage is applied thereto individually and such that even when only half battery voltage is applied thereto (when these two lamps are in series across the battery) they will each yield a light of sufficient intensity to be distinctly visible to the driver. By way of example, with a 12-volt battery, if the lamps 58', 62' are 12-volt lamps, a 6-volt potential applied to each lamp (when the lamps are energized in series) will cause each to light to a sufficient degree to be each clearly seen by the driver.

The switch 100' is arranged to close after the switch 86' by having the switch 100' close at about 242° F. When the water temperature rises above about 242° F., both switches 86', 100' are closed so that the amber lamp 58' is shunted by the shunting circuit means 98', so that the green lamp 68' is shunted by the grounding circuit means 82' and the full battery voltage is applied to the red lamp 62'. The red lamp is, consequently, the only lamp lit indicating to the driver that he should stop his automobile and if close to a service station bring it in for repair.

The self-monitoring feature of the branch 102 works similarly to that described for the branch 12.

It thus will be seen that I have provided self-monitoring automotive condition-warning systems which achieve the several objects of my invention and which are well adapted to meet the conditions of practical use.

As various possible embodiments might be made of the above invention, and as various changes might be made in the embodiments set forth, it is to be understood that all matter herein described or shown in the accompanying drawings is to be interpreted as illustrative and not in a limiting sense.

Having thus described my invention, I claim as new and useful, and desire to secure by Letters Patent:

1. A self-monitoring automotive system for signalling regarding a condition in the automobile and including a battery, an ignition switch, a string of lamps including a first incandescent phase lamp and an endmost second incandescent phase lamp, optical coloring means of a different color for each of the lamps, means connecting the battery, ignition switch and lamps in a series circuit including a return leg between the battery and the endmost lamp, the first lamp having characteristics such that it will light when the full battery voltage is applied thereto and is unlit when in said series circuit and the second lamp having characteristics such that it will light when in said series circuit, and first grounding circuit means including a switch movable between open and closed positions in response to, respectively, one or another phase of the said condition in the automobile, said grounding circuit means running from between the lamps to the return leg, whereby when the ignition switch is closed and the phase responsive switch is closed only the first phase lamp is lit and when the ignition switch is closed and the phase responsive switch is open only the second phase lamp is lit whereby the lighting of a specific lamp indicates the existence of one or the other phase of the condition and so that the extinguishment of all phase lamps, when the ignition switch is closed, indicates that at least one of the lamps is not properly functioning.

2. A self-monitoring automotive system as set forth in claim 1 wherein a current-limiting voltage-dropping resistor is located in the series circuit between the grounding circuit means and the return leg.

3. A self-monitoring automotive system as set forth in claim 2 wherein there are only two phase lamps located in the series circuit.

4. A self-monitoring automotive system as set forth in claim 2 wherein the second phase lamp requires a substantially lower voltage to light than does the first phase lamp.

5. A self-monitoring automotive system as set forth in claim 4 wherein the first phase lamp lights when the full voltage of the battery is applied to it.

6. A self-monitoring automotive system as set forth in claim 2 wherein the condition has three successive phases, a third incandescent phase lamp is located in the series circuit between the first phase lamp and the ignition switch, second grounding circuit means includes a switch movable between open and closed positions in response to change between a certain pair of succeeding phases of the said condition in the automobile, said second grounding circuit means running from between the first and third phase lamps to the return leg, the switches of the first and second grounding circuit means being in closed positions during certain phases and moving from closed to open positions upon the existence of other phases, circuit means including a switch movable between open and closed positions shunts the third phase lamp, the switch of the shunting circuit means moving between open and closed positions in response to change between a different pair of succeeding phases, and the optical coloring means provides a different color for the third phase lamp, whereby when the ignition switch is closed a different phase lamp lights during the existence of each phase, the extinguishment of all phase lamps indicating that at least one of the lamps is not properly functioning.

7. A self-monitoring automotive system as set forth in claim 6 wherein the switches of the shunting circuit means and the first grounding circuit means move simultaneously in the same sense.

8. A self-monitoring automotive system as set forth in claim 6 wherein the switch of the first grounding circuit means closes before the switch of the shunting circuit means closes.

9. A self-monitoring automotive system as set forth in claim 2 wherein the condition has three successive phases, a third incandescent phase lamp is located in the series circuit between the first phase lamp and the ignition switch, second grounding circuit means includes a switch movable between open and closed positions, said second grounding circuit means running from between the first and third phase lamps to the return leg, the switch of the first grounding circuit means being in closed position during the first phase and moving from closed to open position upon the existence of the second phase and the switch of the second grounding circuit means being in open position during the first and second phases and moving from open to closed position upon the existence of the third phase, circuit means including a switch movable between open and closed positions shunts the third phase lamp, the switch of the shunting circuit means being responsive to the existence of the same phases as the switch of the first grounding circuit means and arranged to move in the same sense, and the optical coloring means provides a different color for the third phase lamp, whereby, the ignition switch being closed, during the existence of the first phase the first grounding circuit means and the shunting circuit means are closed and the second grounding circuit means is open so that only the first phase lamp lights, during the existence of the second phase both grounding circuit means and the shunting circuit means are open so that only the second phase lamp lights and during the existence of the third phase the switch of the second grounding circuit means is closed and the switch of the shunting circuit means is open so that only the third phase lamp lights, the extinguishment of all phase lamps indicating that at least one of the lamps is not properly functioning.

10. A self-monitoring automotive system as set forth in claim 2 wherein the condition has four successive phases, a third incandescent phase lamp is located in the series circuit between the first phase lamp and the ignition switch, second grounding circuit means includes a switch movable between open and closed positions in response to change between the first and second phases and runs from between the first and third phase lamps to the return leg, the switch of the second grounding circuit means being in closed position during the first phase and being in open position during the second, third and fourth phases, the switch of the first grounding circuit means being responsive to change between the second and third phases and being in open position during the second phase and being in closed position during the third and fourth phases, circuit means includes a switch movable between open and closed positions in response to change between the third and fourth phases, said last-named circuit means shunting the third phase lamp, the switch of the shunting circuit means being in open position during the first, second and third phases and being in closed position during the fourth phase, the first and third phase lamps having characteristics such that they will light when the full battery voltage is applied to each of them and will light when the full battery voltage is applied across said lamps in series and will be unlit when the three lamps and the resistor are in said series circuit across the battery and the second lamp having characteristics such that it will light when in said series circuit across the battery, and the optical coloring means provides a different color for the third phase lamp, whereby, the ignition switch being closed, during the first phase only the third phase lamp will light, during the second phase only the second phase lamp will light, during the third phase only the first and third phase lamps will light and during the fourth phase only the first phase lamp will light, the extinguishment of all phase lamps indicating that at least one of the lamps is not properly functioning.

References Cited

UNITED STATES PATENTS

| 2,691,744 | 10/1954 | Peters | 340—66 XR |
| 2,698,403 | 12/1954 | Woodham | 340—66 XR |
| 2,751,522 | 6/1956 | Spangenberg | 340—66 XR |
| 3,252,137 | 5/1966 | Montgomery | 340—251 XR |

JOHN W. CALDWELL, *Primary Examiner.*

A. H. WARING, *Assistant Examiner.*